D. H. CORBIN & A. W. HARRIS.
CINEMATOGRAPH TARGET APPARATUS.
APPLICATION FILED MAY 16, 1914.
1,125,660.
Patented Jan. 19, 1915.
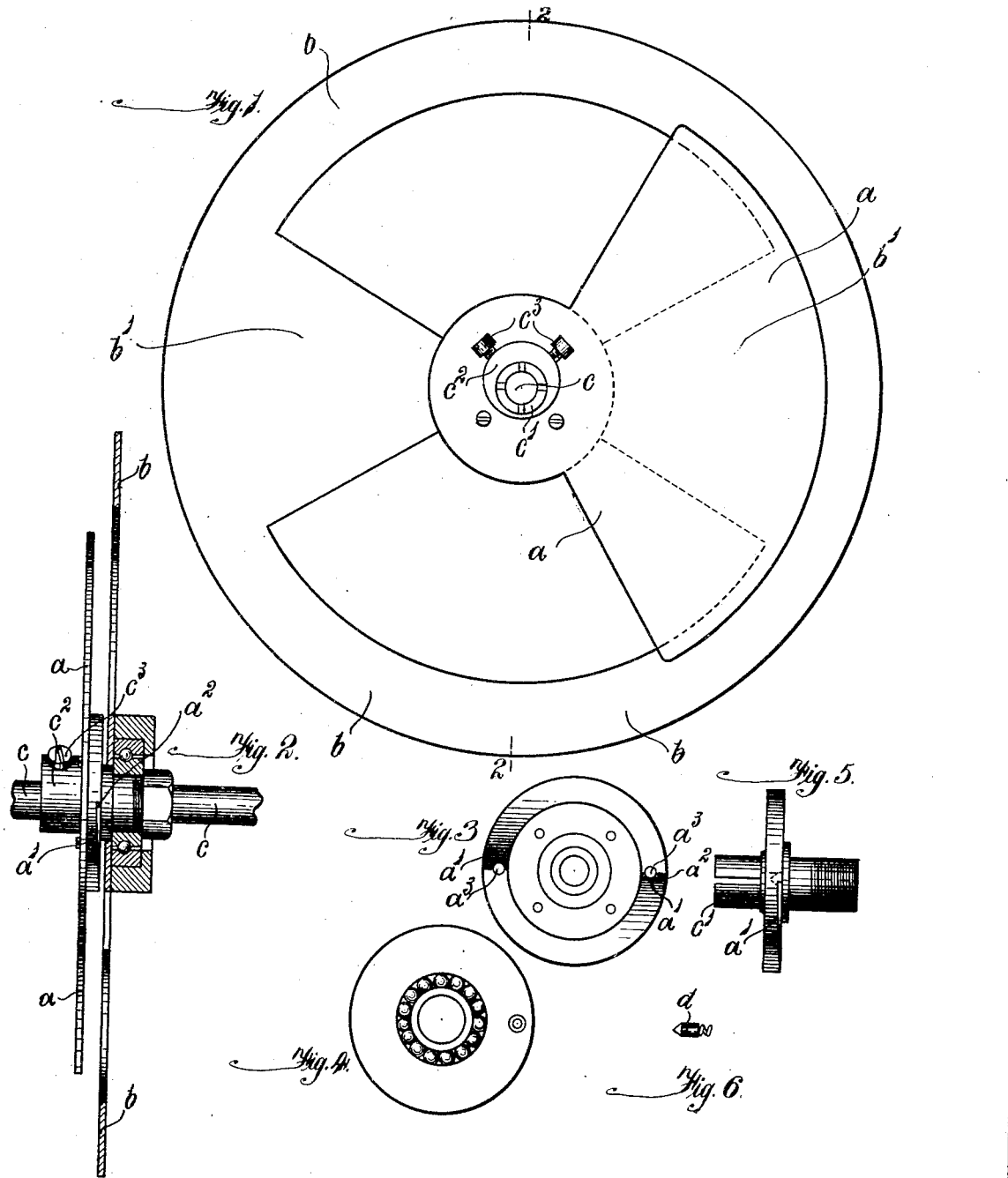
WITNESSES
Cornelius Hoving
Alfred R. Anderson
INVENTORS
A. W. HARRIS AND D. H. CORBIN
By H. van Detennel
ATTORNEY

UNITED STATES PATENT OFFICE.

DOUGLAS HAYNES CORBIN AND ARTHUR WILLIAM HARRIS, OF BIRMINGHAM, ENGLAND, ASSIGNORS TO LIFE TARGETS LIMITED, OF LONDON, ENGLAND.

CINEMATOGRAPH TARGET APPARATUS.

1,125,680.  Specification of Letters Patent.  Patented Jan. 19, 1915.

Application filed May 13, 1914.  Serial No. 839,003.

*To all whom it may concern:*

Be it known that we, DOUGLAS HAYNES CORBIN and ARTHUR WILLIAM HARRIS, subjects of the King of Great Britain, residing at 98 King's road, Erdington, Birmingham, in the county of Warwick, England, and Durley Dene, Jaffray Road, Erdington, Birmingham aforesaid, respectively, have invented a new and useful Improvement in Cinematograph Target Apparatus; and we do hereby declare the following to be a full, clear, and exact description of the same.

Our invention comprises improvements in cinematograph target apparatus more especially of the kind which is described in the prior Patents Nos. 1027371, 1075394 and 1072298.

In cinematograph machines it is customary to employ a pair of shutters adapted to intercept the light rays so as to cut off the picture when the film is moving and also to prevent flickering on the screen. Such shutters usually form parts of a disk, one being substantially one third of the disk *i. e.* the two side edges of the shutters are at an angle of 120 degrees to each other and it is while this shutter is passing the film that the film is moving. The second shutter which is smaller, is at a point diametrically opposite to the first one, this second shutter merely operating to prevent flickering on the screen by cutting off the light rays at a moment corresponding with the middle of the exposure of the picture. The flicker of cinematograph pictures is caused by the contrast between the bright light when the picture is standing stationary upon the screen and the relatively dark screen when the light rays are cut off during the time that the film is moving. The minor portions of the shutter by cutting off the light rays at the middle of the time during which the picture is stationary tend to modify the contrast, and thus diminish the flickering effect; and in arresting the movement of the cinematograph as in the aforementioned prior patents it has been necessary to do this, while the beater-shaft and shutter have been making an angular movement of about 90 or 100 degrees which is difficult and inconvenient in practice.

According to the present invention the shutter device is formed in two parts one part being however free upon the shaft and a second part secured to the shaft rotatable therewith and connected to the first part by a one-way clutch device in such manner that when the one part rotates with the shaft the other part is carried around with it but when said part is stopped the other is free to over-run and to continue to revolve owing to its own momentum.

Referring to the drawings:—Figure 1. is a face view or elevation of a shutter according to this invention. Fig. 2. is a vertical section through same at 2, 2 in Fig. 1. Fig. 3. is a face view of the double inclined member forming part of the driving part of the shutters. Fig. 4. is a similar view of the adjacent face of the driven part of the shutter. Fig. 5. illustrates the hub removed. Fig. 6. illustrates the spring controlled plunger forming part of the one-way clutch mechanism.

In carrying this invention into practice as illustrated upon the accompanying drawings the shutter is in two main parts $a$ and $b$. The part $a$ which is of a size approximately corresponding with one third of a complete disk *i. e.* 120 degrees is of a size adapted to intercept the light rays during the time that the film is moving. This part $a$ is firmly secured to the driving shaft $c$, the illustrated means for this being a split sleeve $c^1$ inside the hub $c^2$, the split sleeve being contracted by the screws $c^3$. The part $b$ includes two sector shaped members $b^1$ each of a size sufficient to prevent flickering. The part $a$ and the part $b$ are connected by a one-way clutch device in such manner that when the part $a$ rotates it carries with it the part $b$, the part $b$ being supported upon the shaft by ball bearings in such manner that when the part $a$ is stopped the part $b$ will freely over-run owing to its own momentum.

As illustrated the part $a$ is formed with a pair of inclines $a^1$ with shoulders $a^2$ while the part $b$ carries a spring plunger $d$ which is adapted to enter a recess $a^3$ in the part $a$ at a point adjacent to the shoulder $a^2$ thus connecting the parts $a$ and $b$ together so that when the part *a* rotates in the proper direction it will carry the part *b* around with it but immediately the part *a* is stopped the momentum of the part *b* will withdraw the taper nosed plunger from the recess allowing the part *b* to freely over-run. The engagement between the plunger and the recess is such as to prevent the part *b* traveling faster than the part *a* when starting up, which might otherwise occur owing to the initial shock which takes place when the plunger first strikes the shoulder.

It will be seen from the drawing that the plunger is located at such a point in the part *b* that when it engages the recess the part *a* covers the one part $b^1$ and is diametrically opposite to the second part $b^1$ so that as the two parts rotate they together form a shutter of substantially orthodox form, *i. e.* a large sector for cutting off the light while the film is moved and a small sector at a joint diametrically opposite for preventing flickering of the film.

When employing the shutter with cinematograph target apparatus having a motion arresting device as according to the prior Patent No. 1075894 the shutter *a* is so secured to the beater-shaft that it is moved at the same time as the film but as the shutter *b* will continue to revolve even after the part *a* has been arrested a longer time is allowed for bringing the motion arresting mechanism into operation than with an ordinary shutter for the whole time occupied while the shutter is moving through two thirds of a revolution or 240 degrees can be taken instead of the very much smaller time when using an ordinary shutter which amounts to about 90 degrees or one quarter of a revolution.

What we claim then is:—

1. In cinematograph target apparatus, the combination of a cinematograph having a shaft; a shutter member carried by said shaft and rotating and stopping therewith; a one way clutch device; and a second shutter member driven by the first shutter member through the medium of the one way clutch device; so arranged that when the motion of the first shutter member is arrested the second shutter member may continue to revolve; for the purpose specified and substantially as set forth.

2. In cinematograph target apparatus, the combination of a cinematograph having a shaft; a shutter member carried by said shaft and rotating and stopping therewith; a second shutter member driven by the first shutter member; a laterally disposed spring plunger carried by one of said shutter members; and a pair of inclines carried by the other of said shutter members and co-acting with said plunger so as to cause the second shutter member to rotate with the first shutter member but permitting the second shutter member to over-run when the first is stopped; for the purpose set forth.

3. In cinematograph target apparatus, the combination of a cinematograph having a shaft; a shutter member carried by said shaft and rotating and stopping therewith; a second shutter member driven by the first shutter member; a laterally disposed spring plunger carried by one of said shutter members; a pair of inclines carried by the other of said shutter members and co-acting with said plunger so as to cause the second shutter member to rotate with the first shutter member but permitting the second shutter member to over-run when the first is stopped; and means for retaining the two shutter members in their correct relation when rotating; for the purpose set forth.

4. In cinematograph target apparatus, the combination of a cinematograph having a shaft; a shutter member secured to said shaft and being in the form of a sector the sides of which make an angle relatively to each other of about 120 degrees; a second shutter member free to rotate upon said shaft and including two sector shaped and diametrically opposite portions, the sides of each of which make an angle relatively to each other of about 60 degrees; a laterally disposed spring plunger carried by one of said shutter members; a pair of inclines carried by the other of said shutter members and co-acting with said plunger so as to cause the second shutter member to rotate with the first shutter member but permitting the second shutter member to over-run when the first is stopped; and means for retaining the two shutter members in their correct relation when rotating; for the purpose set forth.

5. In cinematograph target apparatus, the combination of a cinematograph having a shaft; a shutter member secured to said shaft and being in the form of a sector the sides of which make an angle relatively to each other of about 120 degrees; a second shutter member free to revolve upon said shaft and including two sector shaped and dimetrically opposite portions, the sides of each of which make an angle relatively to each other of about 60 degrees; a laterally disposed spring plunger carried by one of said shutter members; a pair of inclines carried by the other of said shutter members and co-acting with said plunger so as to cause the second shutter member to rotate with the first shutter member but permitting the second shutter member to over-run when the first is stopped; for the purpose set forth.

6. In cinematograph target apparatus, the combination of a cinematograph having a shaft; a shutter member secured to said shaft and being in the form of a sector the sides of which make an angle relatively to each other of about 120 degrees; a second shutter member free to revolve upon said shaft and including two sector shaped and diametrically opposite portions, the sides of each of which make an angle relatively to each other of about 60 degrees; and a one way clutch device; so arranged that when the motion of the first shutter member is arrested the second shutter member may continue to revolve; for the purpose set forth.

In testimony whereof, we have signed our names to this specification in the presence of two subscribing witnesses.

DOUGLAS HAYNES CORBIN.
ARTHUR WILLIAM HARRIS.

Witnesses as to Douglas Haynes Corbin:
HAROLD J. C. FORRESTER,
HERBERT J. O. BARTON.

Witnesses as to Arthur William Harris:
FRANK H. LOGAN,
W. H. BERRIGAN.